Feb. 20, 1923.

C. R. PRATT.
CHUCK.
FILED JUNE 4, 1920.

Inventor:
Charles R. Pratt.
by Emery, Booth, Janney & Varney
Attys

Feb. 20, 1923.

C. R. PRATT.
CHUCK.
FILED JUNE 4, 1920.

Inventor:
Charles R. Pratt,
by Emery Booth Janney & Varney
Attys.

Feb. 20, 1923.
1,446,062.

C. R. PRATT.
CHUCK.
FILED JUNE 4, 1920.

Inventor.
Charles R. Pratt
By Emery, Booth,
Janney & Varney Attys

Feb. 20, 1923.
C. R. PRATT.
CHUCK.
FILED JUNE 4, 1920.
1,446,062.
4 SHEETS—SHEET 4.
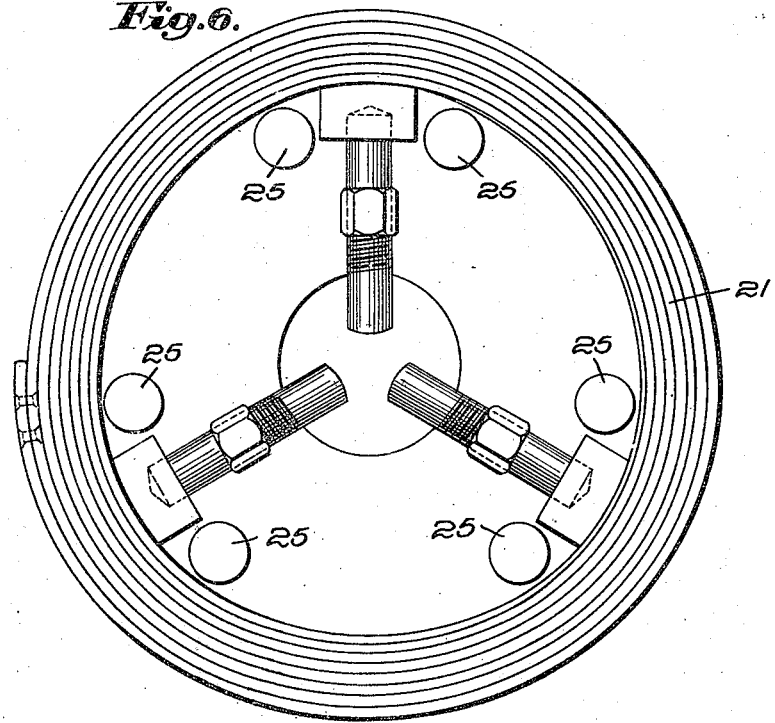
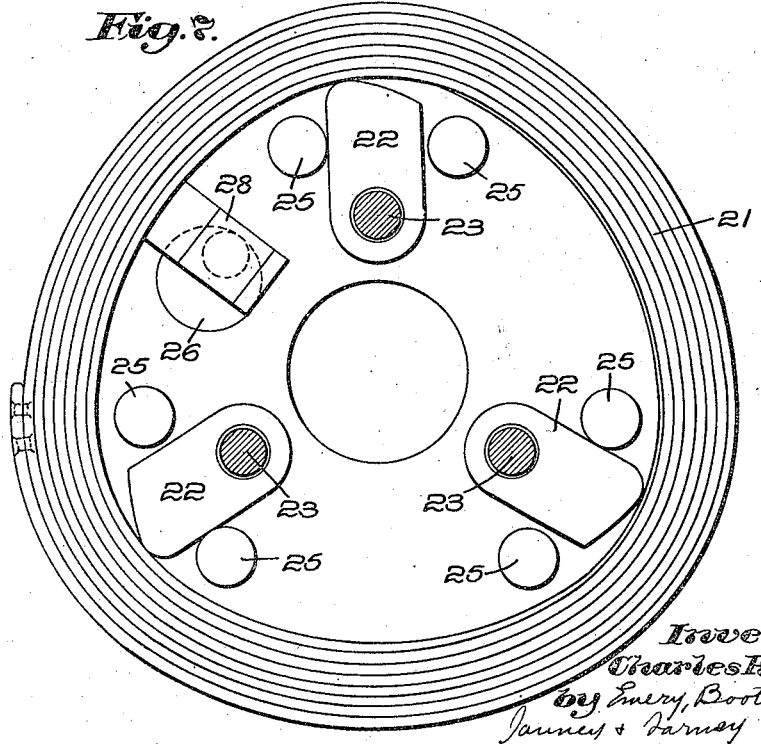

Patented Feb. 20, 1923.

1,446,062

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

CHUCK.

Application filed June 4, 1920. Serial No. 386,492.

*To all whom it may concern:*

Be it known that I, CHARLES R. PRATT, a citizen of the United States, and a resident of Montclair, in the county of Essex, State of New Jersey, have invented an Improvement in Chucks, of which the following description in connection with the accompanying drawings, is a specification, like characters on the drawings representing like parts.

This invention pertains to improvements in chucks.

It is among the objects of the invention to provide a chuck, primarily, though not exclusively, useful in connection with the turning of work on lathe centers.

In the drawings, which show a preferred form of one illustrative embodiment of my invention:—

Fig. 6 is a diagrammatic view showing a preferred form of spring and assembly fixture for use in connection with the assembly thereof with other parts of the chuck;

Fig. 7 is a view similar to Fig. 3, some of the parts being omitted, and showing the relation of parts of the chuck when gripping work under heavy pressure.

Figure 4:
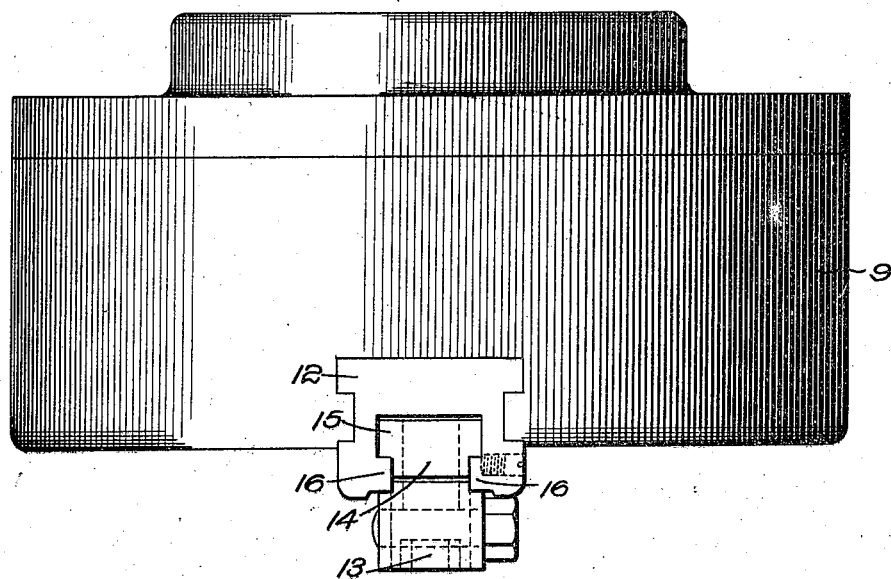
Fig. 4 is a plan view of the chuck shown in Fig. 1.

Referring to the drawings and to the preferred form of my invention selected for illustrative purposes, I have shown a chuck primarily useful for turning work on centers, though many features of my invention may be useful in other connections. The specific form of my invention illustrated includes a chuck body, preferably including a rim portion 9, a face portion 10 and a hub portion 11, said body preferably carrying in guided relation to the face portion a plurality of slides 12, forming a portion of the jaw mechanism, but preferably supplied with work-gripping jaws 13, which may be and preferably are adjustably mounted on the slides 12, such adjustment preferably being, as shown, provided by mounting the gripping jaws 13 in guideways on the slides 12 and by providing clamping means typified by the screw 14 for binding said jaws in any desired adjusted relationship to the slides 12. The details of the preferred form of mounting of the jaws 13 on the slides 12 are best shown in Fig. 4, wherein the clamping nut 15 is slidable in a guide slot in the slides 12, the tightening of the screw 14 pressing the clamping nut 15 and the jaw 13 against flanges 16 on the slide 12.

The preferred form of jaw mounting before described is particularly useful in connection with chucks of the universal type, wherein the jaws are adapted to be moved coordinately by any type of universal jaw operating mechanism, because the absence of the usual screw or other adjustment precludes the putting of undue strain on the universal mechanism which is ordinarily likely to result from the tightening of individual screw adjustments on each jaw separately pursuant to the application of initial pressure of the jaws to the work by the universal mechanism.

Any suitable form of work-gripping bit may be provided in connection with the jaws 13, but I prefer to provide the bits 17 (best shown in Figs. 1 and 2), such bits preferably engaging the work at a point out of line with the center of movement of the jaw and preferably behind the center of movement of the jaw considered with reference to the direction of rotation of the chuck. The bits 17 are preferably pivotally mounted as on studs 18, so that the bits may accommodate themselves to tapering work. Each bit preferably provides line contact with the work, and is preferably adapted to be turned into a plurality of positions to provide a change of working edges, herein shown as four, any one of which may be brought into operative position by turning of the bit pursuant to removal of its stud 18.

The chuck illustrated is primarily, though not exclusively, intended for turning work on centers, and to this end I have provided an aperture extending through the axis of the chuck so that a lathe center held in the spindle of the lathe, may project through the chuck and into proximity to the jaws of the chuck. The lathe spindle, illustrated in the drawings, is numbered 19.

Figure 5:
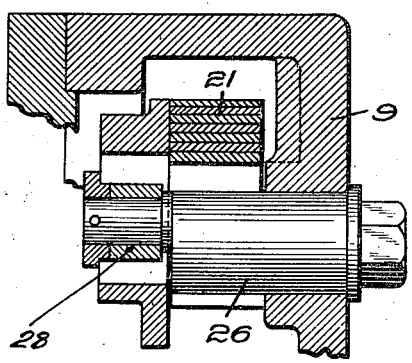
Fig. 5 is a section on the line 5—5 of Fig. 3.
Figure 3:
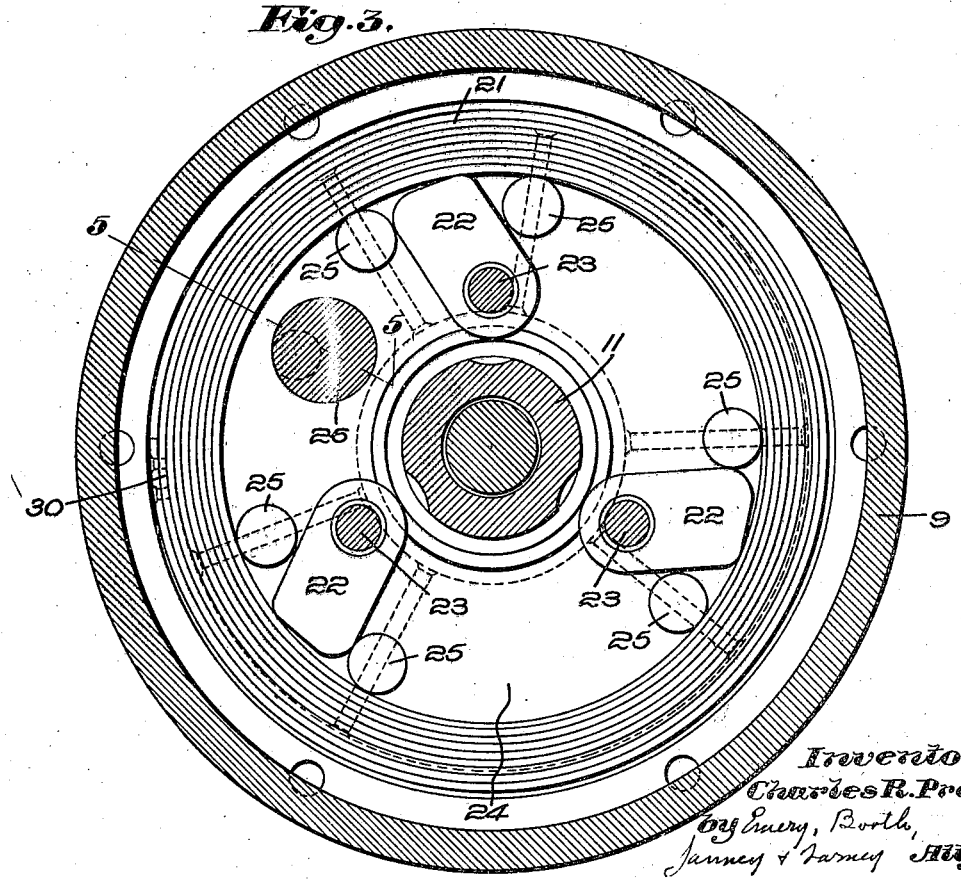
Fig. 3 is a section, partly in elevation, on the line 3—3 of Fig. 2.

In the preferred form of my invention illustrated in the drawings, the pressure of the jaws on the work is resilient, and I preferably provide this resiliency by spring means, herein typified by the distortable ring 21 connected to the jaws by thrust means herein typified by the thrust elements 22, which may operate as toggles and which preferably include features more usually associated with cam mechanism, as more fully described hereinafter. The thrust elements 22 are connected to the slides 12 by pivot pins 23, and the thrust elements 22 bear against the interior of the spring ring 21. The angular position of the thrust elements 22 may be changed to operate the jaws and to put pressure on the spring ring in any suitable way, but I prefer to perform this by providing a spider 24, having means engaging each of the thrust elements 22, such means being typified by the pins or projections 25 located at each side of each thrust element. The spider 24 is preferably adapted to be oscillated to change the angle of position of the thrust elements, such oscillation being conveniently effected by eccentric means 26, best shown on Figs. 1, 3 and 5.

Figure 1:
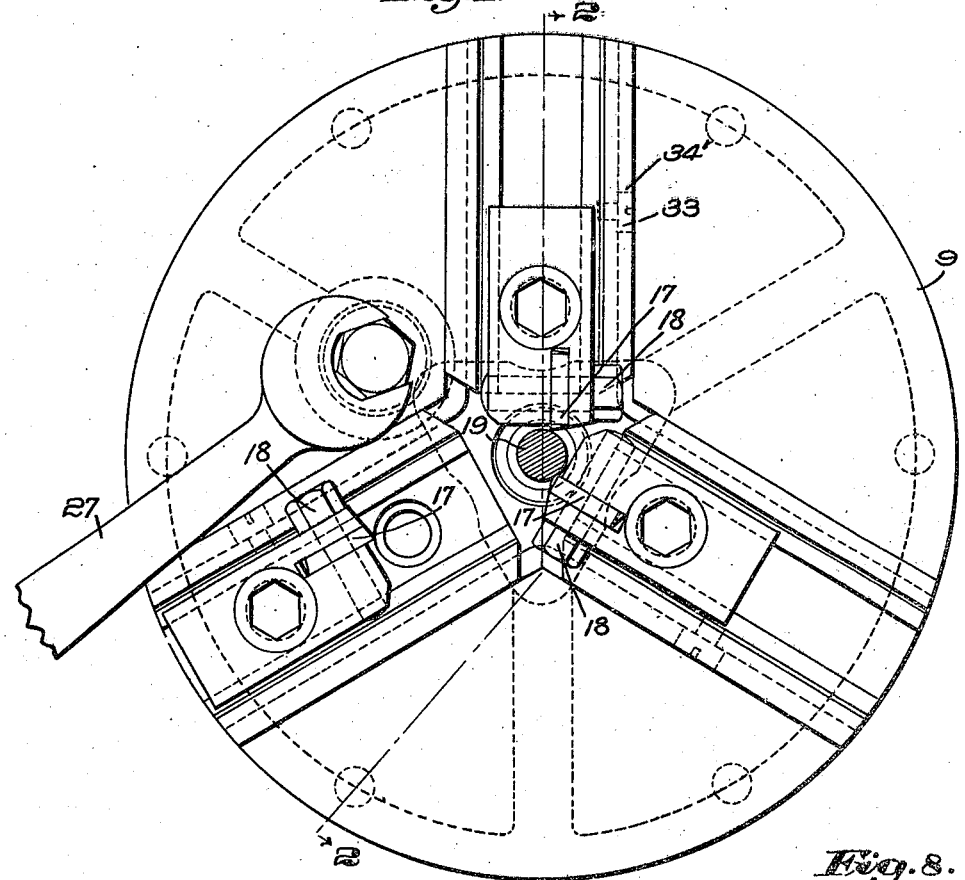
Figure 1 is a front elevation of a chuck.
Figure 8:
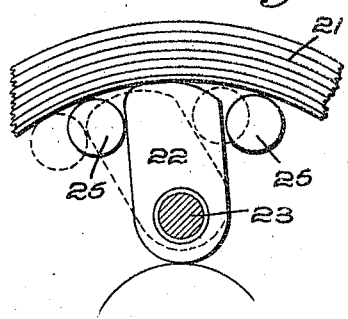
Fig. 8 is a diagrammatic view showing a portion of the parts shown in Fig. 7 while gripping work under a lesser pressure.
Figure 2:
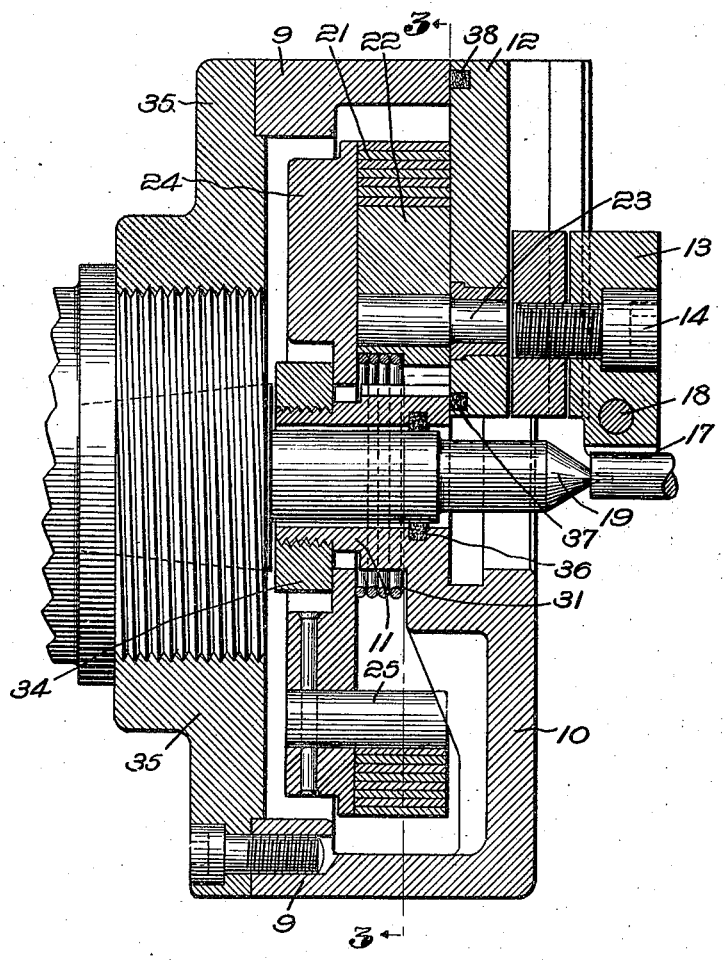
Fig. 2 is a section, partly in elevation, on the line 2—2 of Fig. 1.

When the eccentric 26 is turned by the wrench 27, shown in Fig. 1, the eccentric slide 28 oscillates the spider 24, thereby changing the angular position of the thrust elements 22. As viewed in Fig. 3, the thrust elements 22 are in work-releasing position, while the relation of the parts pursuant to shifting of the spider 24 is shown in Fig. 7. As the spider 24 straightens the thrust elements 22, the initial movement produced thereby is a shifting of the pivots 23 toward the work until the jaws engage the work. The pivots 23 then become fixed points, or substantially fixed points, and the remainder of the movement of the toggles or thrust elements 22 is effective to distort the spring ring 21, thereby applying to the pivots 23 and the jaws connected thereto a resilient pressure which is relatively constant, though it may be somewhat greater where the work gripped is of relatively large size in proportion to the adjustment of the work-gripping jaws than where the work gripped is of somewhat smaller size with reference to the adjustment of the work-gripping jaws. The distortion of the ring illustrated in Fig. 7 is such as to produce a very considerable pressure on the work, while the distortion of the ring shown diagrammatically in Fig. 8 is such as to produce a relatively less pressure on the work.

The thrust elements 22 are preferably, as shown, provided with cam surfaces at their outer ends, so that as their angular position relative to the axis of the jaws is changed, the effective length of the thrust elements is changed. The shaping of these cam surfaces is preferably such as to preserve a more or less constant degree of angularity between the point of contact of the thrust elements on the spring means, the axis of the pivots 23, and a radial line passing through the axis of the pivots 23. Where this preferred construction is used, and the effective angle of the toggle is maintained more or less constant notwithstanding the change of the angle of the toggle as a whole, a much more constant degree of leverage is provided by the toggle than where the effective angularity thereof changes as the actual angularity thereof changes.

The spring means 21 preferably, as shown, takes the form of a ring, and this ring may be and preferably is formed by winding spirally, preferably in close adjacency to one another, a plurality of turns of a single band of spring metal. The spring may be and preferably is kept wound by securing the ends thereof in any suitable way, typified by the riveting together of the outer end thereof to the adjacent spire thereof as by rivets 30.

It is highly desirable that the spring means be under initial stress, so that from the very initiation of distortion thereof a considerable resistance to distortion will be provided, and to this end I may distort the ring somewhat during assembly with the rest of the chuck, as by forcing the ring over the pins 25 on the spider 24. This distortion may conveniently be effected by an assembly tool, best illustrated in Fig. 6, such assembly tool being adapted to force the spring into more or less polygonal form corresponding to the number of jaws to be used on the chuck. The pins 25 are preferably proportioned to maintain at least a portion of this initial distortion of the spring.

Where, as in the preferred construction illustrated, the thrust elements 22 have no positive connection to the spring means, I preferably provide means for maintaining the thrust elements in contact with the spring means, I may conveniently effect this by providing a second spring 31 adapted to press outwardly on the toggles or parts connected therewith. This spring 31 may and preferably does take the form of a ring adapted to be distorted in a plane transverse to its axis and may conveniently be formed helically from a single closely wound wire.

This spring serves not only to keep the toggles or thrust elements in contact with the spring ring, but also serves to open the jaws when pressure of the spring ring on the toggles is relieved.

The preferred form of chuck shown for illustrative purposes is, as before stated, primarily, though not exclusively, for turning work on centers, and to this end the jaws and the mechanism for operating the jaws are preferably of the floating type, so that the position of the jaws relative to one another and relative to the body of the chuck may be determined by the surface of the work which is positioned by the center of the lathe. In the chuck illustrated, the spring ring 21, the thrust elements 22, the slides 12 and the jaws 13 are floating in the sense that they are free to move at least for a limited distance in a direction transverse to the axis of the chuck, such floating movement being determined as the jaws grip the work by the position of the gripped surfaces of the work determined by the lathe center. I also preferably mount the spider 24 for free floating movement. When the slides 12 are fully opened by operation of the floating mechanism controlling the same, the float is, in a sense, discontinued and the position of the slides and co-operating parts relative to the chuck body is determined in such a way as to more or less center the jaws and insure an ample aperture between the jaws for the introduction of the work in proper relation to the lathe center. This determining of the slide position may conveniently be effected by limiting means whereby the outward movement of each slide is determined and by providing a sufficient throw of the slides to insure the movement of all the slides to the limit of their outward movement. Such limiting means may take the form of keys 33 secured to the slides, adapted to abut against the outer ends 34′ of slots in or connected to the chuck body.

In the preferred form of chuck illustrated, the toggles 22 are held in assembled relationship with the slides 12, and the spring ring 21 is held in place by the spider 24, the spider 24 being held against displacement in a direction toward the rear of the chuck by means typified by the nut 34, which may be threaded to the hub 11 of the chuck body. In the preferred form of my invention, the spider 24 is free to float relative to the chuck body.

The toggles or thrust elements 22, while free to swing between the slides 12 and spider 24, preferably substantially fill the space between the slide and the spider so that the pivots 23 are in a measure relieved of bending strain by reason of the support of the parts 22 between the slides and spider.

The back of the chuck is preferably closed by a plate 35, which may be bored and tapped or otherwise fitted for attachment to the lathe spindle. When the chuck is on the spindle, the back of the chuck is entirely closed and there are preferably no openings through any part of the chuck body through which lubricant confined in the chuck body may escape. This tightness may be insured by the provision of packing 36 around the spindle and by the provision of packing 37, 38 at either end of the slides. The floating of the jaw-actuating mechanism in the chuck body assists the distribution of heavy lubricant to all working parts thereof, and especially to the leaves of the spring and the pivots of the toggles.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

1. A chuck comprising, in combination, a plurality of work-gripping elements and a spirally wound, laminated closed spring ring exerting pressure in a direction transverse to its axis for pressing said elements against the work.

2. A chuck comprising, in combination, a plurality of work-gripping elements and a spirally wound, laminated closed spring ring exerting pressure in a direction transverse to its axis for pressing said elements against the work, the adjacent spires of said spring lying against each other.

3. A chuck comprising, in combination, a plurality of work-gripping elements and a spirally wound laminated closed spring ring exerting pressure in a direction transverse to its axis for pressing said elements against the work, the adjacent spires of said spring lying against each other and held against uncoiling movement.

4. A chuck comprising, in combination, a jaw, and a swinging thrust element connected to said jaw, said thrust element having a cam surface shaped to transmit pressure directly in a substantially radial direction throughout a substantial portion of its swinging movement.

5. A chuck comprising, in combination, a rectilinearly shiftable jaw, a swinging thrust element connected to said jaw, said thrust element having a cam surface providing varying effective lengths of the thrust element as the thrust element is swung to actuate reciprocation of the jaw.

6. A chuck comprising, in combination, a plurality of jaws, laterally swinging thrust elements connected to said jaws, oscillatory means for swinging said thrust elements, and a spring ring surrounding said thrust elements, said thrust elements bearing against but not positively connected to said spring ring.

7. A chuck comprising, in combination, a plurality of jaws, swinging thrust elements connected to said jaws, oscillatory means for swinging said thrust elements, and a distortable spring ring surrounding said thrust elements, said thrust elements bearing against but not positively connected to said ring.

8. A chuck comprising, in combination, a plurality of jaws, swinging thrust elements connected to said jaws, means for swinging said thrust elements, and distortable spring means pressing against the outer ends of said thrust elements, said thrust elements bearing against but not positively connected to said spring means.

9. A chuck comprising, in combination a jaw, spring means constantly urging said jaw into work-releasing position, operative control means for actuating said jaw toward the work and spring means between said operative control means and said jaw for modifying the action of said operative control means into a yielding instead of a positive pressure.

10. A chuck comprising, in combination, a jaw, a pressure-applying spring for determining the pressure of the jaw on the work, a thrust element bearing against said spring and connected to said jaw, and a second spring for maintaining said thrust element against the first-named spring during the releasing action of the jaw.

11. In a chuck, a plurality of jaws, toggle means for actuating said jaws, a body, and an oscillatory spider for swinging said toggles, and spring means carried by said spider for limiting the pressure applied to the jaws.

12. In a chuck, a plurality of jaws, a spider, spring means normally held under stress by said spider, and means between the spring means and the jaws which increases the stress on said spring means when said jaws grip the work.

13. In a chuck, a plurality of jaws, a ring-like-spring, means normally distorting said spring to provide initial stress, and thrust elements between the spring and jaws, said thrust elements angularly shiftable to actuate the jaws and to increase distortion of the spring when the jaws are forced against the work.

14. A chuck having a body portion, jaws movably guided in said body portion, and a floating portion in said body portion operatively connected to said jaws and permitting relative eccentric shifting thereof while guided in said body portion, said body portion completely surrounding and enclosing said floating portion whereby lubricant contained in said body portion may be distributed through the working parts of the floating portion as said floating portion is moved relative to said body portion.

15. A chuck comprising, in combination, a plurality of jaws, thrust means for moving said jaws toward the work, and spring means compressed when said jaws grip the work and expansible for thrusting said jaws and thrust means away from the work.

16. A chuck comprising, in combination, a plurality of jaws, thrust means for moving said jaws toward the work, and a ring-like spring means compressed when said jaws grip the work and expansible for moving said jaws and thrust means away from the work.

17. A chuck comprising, in combination, a plurality of jaws, thrust means for moving said jaws toward the work, and cylindrical, helical spring means compressed when said jaws grip the work and expansible for moving said jaws and thrust means away from the work.

18. A chuck comprising, in combination, a body, jaw-carrying slides guided in said body, transversely floating means for moving said slides toward the work, jaws slidably and adjustably mounted in said slides and clamping means for holding said jaws in adjusted position on said slides, whereby movement of said jaws under pressure toward the work is limited to the range of movement and to the pressure of said transversely floating means.

19. A chuck comprising, in combination, a body, jaw-carrying slides guided in said body, transversely floating means for moving said slides toward the work, said transversely floating means including spring means limiting the pressure applied to the work, jaws slidably mounted on said slides, whereby movement of said jaws under pressure toward the work is limited to the range of movement of the transversely floating means, and whereby the application of increased pressure to the jaws by adjustment of said jaws on the slides after work-gripping operation of said transversely floating means is precluded.

20. A chuck having a body providing an external flange, a face portion and a central hub; jaws slidably guided in said body; and transversely floating means surrounding said hub for actuating said jaws.

21. A chuck having a body providing an external flange, a face portion and a central hub; jaws slidably guided in said body; transversely floating means surrounding said hub for actuating said jaws; and means on said hub opposing displacement of said floating means in a direction toward the rear of said body.

22. A chuck comprising, in combination, a body including a face portion and a hub portion, jaw slides movable in guides in said face portion, toggles rearwardly of said face portion and connected to said slides, a plate rearwardly of said toggles, and means on said hub portion opposing displacement of said plate in a direction toward the rear of said body, said plate free to float in a direction transverse to the axis of the chuck.

23. A chuck comprising, in combination, a body including a face portion and a hub portion, jaw slides movable in guides in said face portion, toggles rearwardly of said face portion and connected to said slides, a plate rearwardly of said toggles, and means on said hub portion opposing displacement of said plate in a direction toward the rear of said body, said plate holding said toggles in assembled relation to said slides.

24. A chuck comprising, in combination, a body including a face portion, jaw slides movable in guided relation to said face portion, toggles rearwardly of said face portion and connected to said slides, a plate rearwardly of said slides and means attached to the chuck body opposing displacement of said plate in a direction rearwardly of the body, said plate free to float in a direction transverse to the axis of the chuck.

25. A chuck comprising, in combination, a body including a face portion, jaw slides movable in guided relation to said face portion, toggles rearwardly of said face portion and connected to said slides, a plate rearwardly of said slides and means attached to the chuck body opposing displacement of said plate in a direction rearwardly of the body, said plate holding said toggles in assembled relation to said slides.

26. A chuck comprising, in combination, a body, jaws, a floating spider, and means for oscillating said spider to actuate movement of the jaws.

27. A chuck comprising, in combination, a body, jaws, a floating spider, and means for oscillating said spider to actuate movement of the jaws, said means permitting said spider to float freely in all directions during oscillation thereof.

28. In a chuck, the combination with a body portion and jaws movable relative thereto, of a floating member having a motion generally concentric to the axis of the chuck but rectilinearly shiftable in a plane perpendicular to said axis, and a toggle pivoted at one end to said jaw and at the other end bearing against said member.

29. In a chuck, the combination with a body portion and jaws movable relative thereto, of a floating member having a motion generally concentric to the axis of the chuck but rectilinearly shiftable in a plane perpendicular to said axis, a toggle pivoted at one end to said jaw and at the other end bearing against said member, and means for turning said member relative to the chuck.

In testimony whereof, I have signed my name to this specification.

CHARLES R. PRATT.